Patented Aug. 15, 1950

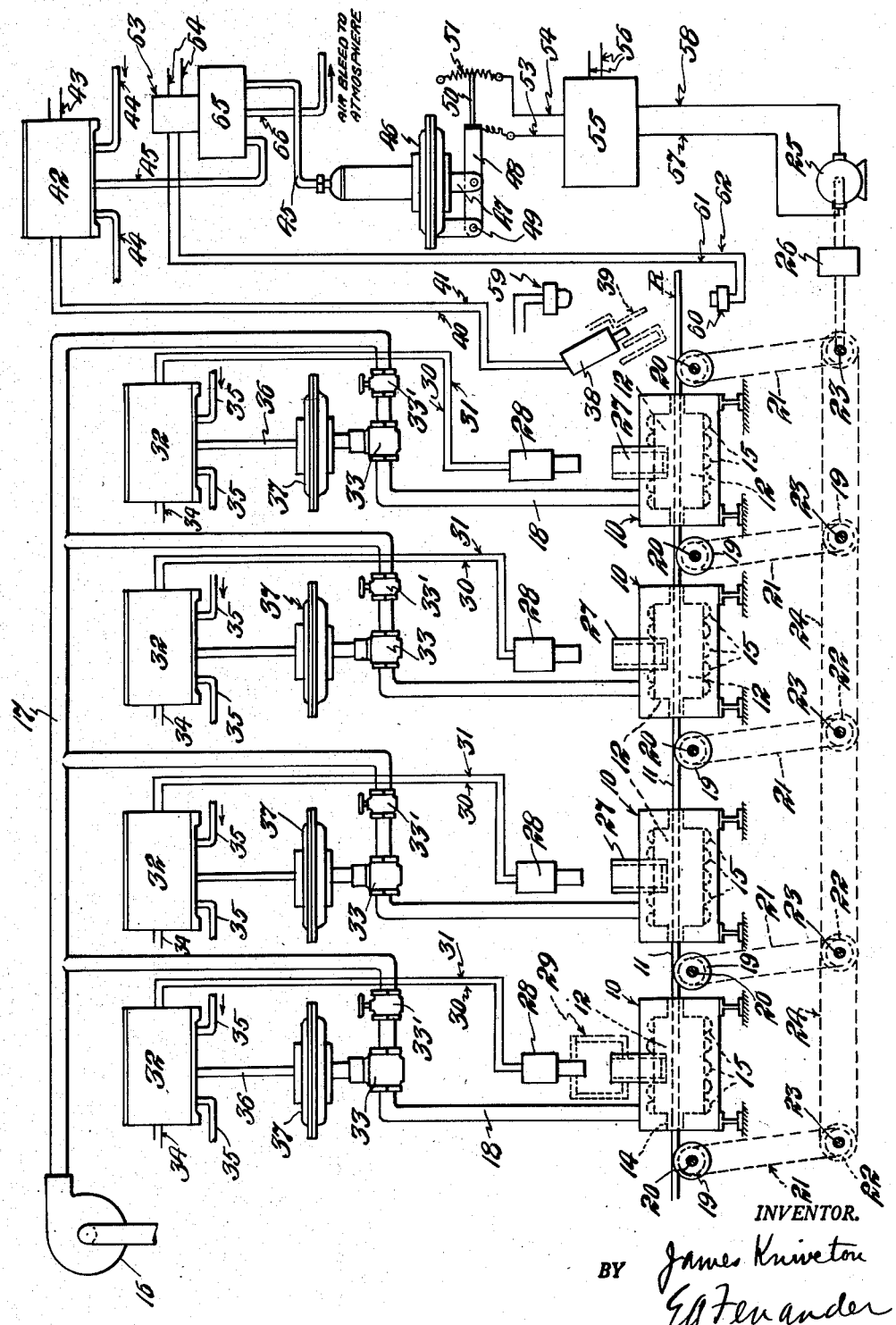

2,518,905

UNITED STATES PATENT OFFICE 2,518,905

CONTROL SYSTEM FOR HEATING APPARATUS HAVING A NUMBER OF HEATING ZONES FOR HEATING WORK

James Kniveton, Wyncote, Pa., assignor to Selas Corporation of America, Philadelphia, Pa., a corporation of Pennsylvania Application November 9, 1946, Serial No. 708,856

13 Claims. (Cl. 263—3)

My invention relates to control systems for heating apparatus having a number of heating zones for heating work, and, although I do not wish to be limited thereto, is especially concerned with such control systems for heating apparatus in which work or stock of elongated extent, such as tubing, bars, and the like, is moved lengthwise through a number of furnace units spaced relatively close together in end to end relation for progressively heating successive longitudinal portions of the work or stock.

In recent years considerable study has been given to heating of work pieces or stock of elongated extent by moving the work in single line transit and in endless procession through a number of furnace units for progressively heating successive longitudinal portions of the work to a high temperature. When it is desired to heat work rapidly in single line transit, the furnace units are preferably of a type having refractory lined chambers in each of which a high thermal head is produced by an immense heat release closely fitting about the traveling work pieces.

When the furnace units are operated to produce a high thermal head in order to obtain a fast rate of heat penetration into the work, the problem of effecting uniform heating of the work in some instances has been especially troublesome. The heating effected by each furnace unit is dependent upon a fixed rate of heat input into the work, and the time the work is exposed to the high temperature developed in the furnace chamber. It is often exceedingly difficult to heat work uniformly by simply varying the amount of heat supply to the furnace chambers in accordance with changes in chamber temperatures. This is so because of the high temperatures involved and the fact that most commercially produced stock, such as tubing, bars, rods and the like, will vary to a certain extent in size and weight. The conventional type of control for controlling the heat supply in accordance with variations in temperature in the furnace chamber is capable of maintaining the furnace chamber temperature substantially constant within reasonable limits providing the work is constantly moving through the furnace units. However when there is a variation in load, that is, the weight and size of the work varies, the temperature of the furnace chamber cannot be increased or decreased rapidly because of the heat stored in the refractory linings thereof.

It is an object of the invention to provide an improved control system for heating apparatus having a number of heating zones or stations, particularly to effect substantially uniform heating of work. I accomplish this by providing a control system for heating apparatus having a number of heating zones or stations in which the amount of heat supplied at each station or zone is independently controlled, preferably in accordance with the temperature developed or produced at each such zone, and in which the movement of the work relative to the heating zones is controlled in accordance with the temperature or thermal condition of the work after it has been heated to an elevated temperature. Preferably, the movement of the work through or past successive heating zones is controlled in accordance with changes in temperature of the heated work at a region in its path of movement at which the work normally has reached a temperature in the temperature range to which it is desired to ultimately heat the work.

In controlling the rate of movement of the work in accordance with the temperature thereof at a particular region in its path of movement, the control system may respond and act to slow down the movement of the work unduly because of a gap between adjacent work pieces at the particular region at which the temperature of the heated work is observed. In accordance with the invention, the control system may embody provisions to render the normal control of the rate of work movement momentarily inoperative when it responds to an abnormally low temperature value as the result of a gap between adjacent work pieces.

The invention, together with the above and other objects and advantages thereof, will be more fully understood upon reference to the following description taken in conjunction with the accompanying drawing forming a part of this specification, and in which the single figure more or less diagrammatically illustrates heating apparatus provided with a control system embodying the invention.

Referring to the drawing, I have shown my invention as applied to a number of furnace units 10 in end to end relation and through which work 11 of elongated extent, such as bars, for example, is passed for progressively heating successive longitudinal portions thereof to a desired elevated temperature. Hence, the furnace units provide a number of heating stations or zones alongside one another for continuously heating work at a rapid rate wherein the work moves in single line transit and in endless procession through the furnace units.

Each furnace unit 10 has a refractory lined chamber 12 provided with aligned openings 14 at the opposite end walls thereof through which the work 11 enters and leaves the chamber. When a high rate of heat liberation is desired, a number of burners 15 are crowded and incorporated in the refractory walls of each chamber. Although not to be limited thereto, the furnace units 10 may be of the kind disclosed and illustrated in Frederic O. Hess application Serial No. 602,323, filed June 29, 1945.

A combustible gaseous mixture, such as a mixture of ordinary city gas and air, for example, is supplied to the furnace units 10 from a blower or compressor 16 through a main conduit 17 and branch conduits 18. The branch conduit 18 for each furnace unit 10 is connected in any suitable manner (not shown) to supply combustible gaseous mixture under pressure to the burners 15. Such connections for supplying combustible gaseous mixture to the burners 15 are fully disclosed in the aforementioned Hess application which may be considered as being incorporated in this application, and, if desired, reference may be had thereto for a detailed description of the furnace units 10.

The work 11 is moved through the furnace units 10 by conveyor rollers 19 which are positioned in the gaps between the furnace units and at regions adjacent to the entrance and exit openings of the first and last furnace units through which the work passes. The rollers 19 may be driven in any suitable manner, and, as diagrammatically shown, are mounted on shafts 20 which are driven by endless chains 21 connected to gears 22 fixed to the shafts 20 and 23, respectively. The shafts 23 are interconnected by endless chains 24 and arranged to be driven by an electric motor 25 through suitable speed reducing mechanism 26.

In accordance with the invention, a control system is provided for the furnace units 10 whereby the supply of combustible gaseous mixture to each furnace unit is controlled responsive to the temperature developed or produced therein. This is accomplished by providing for each furnace unit 10 a hollow tube 27 of high temperature refractory material which extends through the refractory wall thereof. The inner ends of the tubes 27 are closed and become heated to incandescent temperatures during operation of the furnace units. The ends of the tubes 27 extending exteriorly of the furnace units 10 are open, and adjacent such open ends are provided radiation responsive thermopiles 28 of any well known type. Each thermopile 28 is so positioned that it sights the closed end of one of the refractory tubes 27, and, while not necessary, a suitable shell or housing may be provided between each thermopile and adjacent open end of a tube 27, as indicated by dotted lines at 29 for the extreme left-hand furnace unit 10.

The thermopiles 28 are connected by conductors 30 and 31 to suitable electronic control devices 32 operable to regulate valves 33 of the proportional type which are connected in the branch conduits 18 and never fully closed during operation of the furnace units 10. Manually operable valves 33' are provided in the branch conduits 18 for shutting off the supply of combustible fuel mixture to the furnace units 10. The electronic controls 32, which are only schematically illustrated and of a potentiometer type adapted for use with air operated valves, may be of any well known type. Each electronic control device 32 is connected by conductors 34 to a suitable source of electrical supply and responds to the thermopile 28 associated therewith to control and regulate the pressure at which air is supplied from an air supply line 35 through a tube 36 to a diaphragm-operated valve motor 37. Each valve motor 37 is connected to one of the valves 33 for controlling and regulating the supply of combustible gaseous mixture to one of the furnace units 10.

The control for each furnace unit 10 just described is adjusted to maintain the desired elevated temperature therein. When the temperature in a furnace chamber 12 changes from the desired value, the electronic control device 32 responds to the thermopile 28 to vary the pressure at which air is supplied from the air supply line 35 through the tube 36 to the diaphragm-operated motor 37. When the temperature in any chamber 12 rises above the desired value, the control just described acts to move the valve 33 toward and nearer to its closed position; and conversely, when the temperature in the chamber 12 falls below the desired value, the control acts to move the valve 33 away and farther from its closed position.

In addition to the controls just described for the furnace units 10, a control is also provided for regulating the rate of movement of the work 11 through the furnace units 10 responsive to the temperature of the work when it has been heated to a desired elevated temperature. In the embodiment illustrated, a thermopile 38 is positioned adjacent the exit end of the last furnace unit 10 from which the heated work emerges. The thermopile 38 is positioned to sight at a region R in the path of movement of the work, and, if desired, a hollow sleeve through which a coolant is circulated may be provided between the region R and the thermopile, as indicated by dotted lines at 39. In this manner the thermopile 38 is effectively shielded and sensitive only to changes in temperature or the thermal condition of successive portions of the work at the region R.

The thermopile 38 is connected by conductors 40 and 41 to an electronic control device 42 like the control devices 32 referred to above. The control device 42 is connected by conductors 43 to a suitable source of electrical supply and responds to the thermopile 38 to control and regulate the pressure at which air is supplied from an air supply line 44 through a tube 45 to a diaphragm-operated valve motor 46. The valve motor 46 acts to move a member 47 which is pivotally connected to an intermediate region of a lever 48 pivoted at 49 to the casing of the valve motor.

An arm 50 of a rheostat 51 is connected to an outer insulated portion 52 of the lever 48. The rheostat 51 is associated with and connected by conductors 53 and 54 to an electronic control device 55 which in turn is connected by conductors 56 to a source of electrical supply and by conductors 57 and 58 to the electric motor 25. The electronic control device 55 may be of any well known type which responds to changes in position of the rheostat arm 50 to change the speed of the electric motor 25.

The control just described for regulating the rate at which the work 11 is moved through the furnace 10 is adjusted so that the work is discharged from the last furnace unit 10 at a desired elevated temperature. When the temperature of the work at the region R changes from the desired temperature, the electronic control device 42 responds to the thermopile 38 to vary the pressure at which air is supplied from the air supply line 44 through tube 45 to the diaphragm operated motor 46. This moves the control member 47 and shifts the position of the rheostat arm 50, whereby the electronic control device 55 responds to change the speed of the motor 25. When the temperature of the work at the region R rises above the desired temperature, the control just described acts to increase the speed of the motor 25 and hence the rate at which the work 11 is moved through the furnace units 10; and conversely, when the temperature of the work at the region R falls below the desired uniform temperature, the control acts to reduce the speed of the motor 25 and hence the rate at which the work is moved through the furnace units 10.

When work pieces are moved lengthwise in succession through the furnace units 10 and the ends of adjacent work pieces do not abut each other, the thermopile 38 at such times normally would cause the electronic control device 42 to act responsive to an abnormally low temperature condition when the gap between adjacent work pieces is at the region R and such region is not taken up by a heated portion of a work piece. In order to prevent this, a suitable control is provided in the illustrated embodiment including a light source 59 and a photo-electric relay 60 positioned directly opposite each other at opposing sides of the work 11 at the region R. The photo-electric relay 60 is connected by conductors 61 and 62 to an electromagnetic device 63 connected by conductors 64 to a source of electrical supply and arranged to operate valve mechanism 65 which is connected in the tube 45.

When heated work at the region R is interposed between the light source 59 and the photo-electric relay 60, the operation of the control for regulating the rate of movement of the work 11 is accomplished as described above. In the event that the ends of adjacent work pieces do not abut each other and a gap is formed therebetween, the photo-electric relay 60 receives light rays from the light source 59 during the interval of time the gap is at the region R. When this occurs, the photo-electric relay 60 becomes effective to cause energization of the electromagnetic device 63 whereby the latter actuates the valve mechanism 65 and air is bled from the tube 45 through a conduit 66 to the atmosphere. Electromagnetic devices 63 and valve mechanisms 65 of the kind just described are well known in the control art and are only diagrammatically illustrated herein.

By bleeding air from the valve mechanism 65, the diaphragm-operated motor 46 is momentarily rendered inoperative and the rheostat arm 50 remains in a fixed position. Hence, even though the electronic control device 42 responds to the thermopile 38 when a gap between adjacent work pieces is passing the region R and attempts to reduce the speed of the motor 25 by reason of the abnormally low temperature at the region R, the photo-electric relay 60 comes into play whereby the electromagnetic device 63 becomes operable to cause the valve mechanism 65 to bleed air to the atmosphere through the conduit 66 and momentarily freeze the rheostat arm 50 to the position to which it was adjusted before the gap between the adjacent work pieces appeared at the region R. When the gap has moved past the region R and the photo-electric relay 60 is cut off from the light source 59 by the heated work, the valve mechanism 65 then resumes its normal operating position and the diaphragm-operated motor 46 again becomes effective to regulate the rheostat arm 50 and control the speed of the motor 25 responsive to the temperature of the heated work at the region R.

It will be apparent from the foregoing that the thermal responsive devices or thermopiles 28 respond to changes in temperature of the closed ends of the refractory tubes 27, that is, to changes in a temperature condition influenced or affected by changes in temperature in the chamber 12. Hence, the thermopiles 28 do not respond to changes in temperature of the work 11 being heated. The thermopile 38, on the other hand, responds to changes in temperature of the heated work 11 at the region R. In the embodiment illustrated, the thermopile 38 responds to changes in the thermal condition of the heated work, that is, to changes in the radiant energy emitted by successive portions of the heated work at the instant such heated portions pass the region R.

The combination control arrangement described above has been applied to a multiple furnace unit installation in the field and has proven quite satisfactory for heat treating work uniformly to a desired elevated temperature. The independent controls for the several furnace units 10 are adjusted to supply the desired amount of heat in each chamber 12, that is, the temperatures in the several chambers 12 are adjusted to provide the desired heating curve for work passing through the successive furnace units 10. Thus, the temperatures maintained in successive chambers 12 may be increasingly higher, or, after the work has been treated to the desired elevated temperature in only a fraction of the furnace units, the remaining furnace units through which the work passes may serve simply as soaking zones to promote distribution of heat in the work.

When the temperatures in the chambers 12 fall or rise from their desired or predetermined values, rapid adjustment of the heat supply, to bring the temperatures in the chambers back to the desired values, is not possible. While the controls provided for the individual furnace units 10 ultimately make the necessary temperature adjustments, several hundred feet of work may have passed through the furnace units. Rapid adjustment of the temperatures in the chambers 12 is not possible because of the enormous amount of heat stored in the inner refractory linings of the furnace units. This is especially true when rapid heating of work is being effected and the furnace units are being operated at an extremely high thermal head or temperature gradient, so that rapid penetration of heat into the work is accomplished.

By combining with the independent temperature controls for each furnace unit 10 the additional control for regulating the rate of movement of the work responsive to the temperature of the heated work, it is possible to heat treat successive longitudinal portions of work substantially uniformly to the same elevated temperature. The additional control for regulating the rate of movement of the work serves to correct for the deficiencies in the independent furnace unit controls and supplements and works together with the latter to promote substantially uniform heating of work.

Thus, in the event the furnace chamber temperatures should rise above their desired values, the independent furnace controls would immediately reduce the amount of combustible gaseous mixture supplied to the chambers. While the necessary temperature adjustments are taking place in the chambers 12 to establish a new equilibrium condition, the control for regulating the rate of movement of the work immediately comes into play to increase the speed at which the work passes through the furnace units 10. As the correction for the furnace unit temperatures is being effected to bring down these temperatures to their desired values, the control for regulating the rate of movement of the work acts to gradually decrease the movement of the work until the furnace chamber temperatures are again at the desired values.

It will now be understood that an improved control system has been provided in which the control for regulating the rate of movement of the work 11 acts more or less as a check and balance for the independent controls for the several furnace units 10 and cooperates with the latter to effect substantially uniform heating of work.

In the illustrated embodiment of the invention the thermopile 38 for controlling the rate of movement of the work is located adjacent to the exit opening 14 of the last furnace unit 10 from which the heated work is discharged. It is to be understood that the thermopile 38 in certain instances may be located in the gap between adjacent furnace units 10, and this is especially true when the work is heated to the desired elevated temperature after passing through only a fraction of the furnace units and the remaining furnace units are employed primarily as soaking zones. In such case, the thermopile 38 may be positioned immediately adjacent the inlet end of the furnace unit 10 at which soaking is instigated. In any event, the principles of the invention may be effectively practiced by locating the temperature responsive device, such as the thermopile 38, for example, at any region in the path of movement of the work at which the work normally reaches a temperature in the range of the desired elevated temperature to which the work is to be heated.

The thermopile 38 and control associated therewith normally act to change the rate of movement of the work in a normal regulating range. By providing the photo-electric relay 60 and control associated therewith which is connected in the tube 45, the diaphragm operated motor 46 is rendered inoperable to cause a reduction in the rate of movement of the work which is substantially below the normal regulating range when a portion of the heated work is not at the region R.

Although I have shown and described a particular embodiment of the invention, it will be apparent to those skilled in the art that modifications and changes may be made without departing from the spirit and scope of the invention, as pointed out in the following claims.

What is claimed is:

1. Apparatus comprising the combination of heating means providing a number of heating stations or zones alongside one another for heating work pieces, means for moving the work pieces in succession in a fixed path of movement with respect to the heating means to heat the work pieces, means for independently varying the amount of heat supplied at each zone by said heating means, means responsive to a condition affected by the temperature developed at each zone for independently controlling the heat varying means therefor to regulate separately the amount of heat supplied by the heating means to each zone, control means responsive to changes in temperature of the heated work pieces at a region in said path of movement for controlling said moving means to change the rate of movement of the work pieces, and additional means operable when said control means tends to respond to an abnormally low temperature value at said region, as the result of a gap between adjacent work pieces, to render said control means momentarily inoperable.

2. Apparatus as set forth in claim 1 in which said additional means includes a light source and a photo-electric relay at opposing sides of the path of movement of the work pieces at the vicinity of said region.

3. Apparatus comprising the combination of heating means providing a number of heating stations or zones alongside one another for heating work pieces, means for moving the work pieces in succession in a fixed path of movement with respect to the heating means to heat the work pieces, means for independently varying the amount of heat supplied at each zone by said heating means, means responsive to a condition affected by the temperature developed at each zone for independently controlling the heat varying means therefor to regulate separately the amount of heat supplied by the heating means to each zone, control means responsive to changes in temperature of the heated work pieces, at a region in said path of movement, for controlling said moving means to change the rate of movement of the work pieces in a normal regulating range, and means operable when work pieces are not at said region to render said control means inoperable to reduce the rate of movement of the work pieces substantially below the normal regulating range.

4. Apparatus comprising the combination of heating means for heating work pieces, means for relatively moving the work pieces and the heating means to heat the work pieces, means responsive to changes in temperature of the heated work for controlling the moving means to change the rate of relative movement of the heating means and the work, and means operable when said control means tends to respond to an abnormally low temperature value, as the result of a gap between adjacent work pieces, to render said control means momentarily inoperable.

5. Apparatus comprising the combination of heating means for heating work pieces, means for moving the work pieces in succession in a fixed path of movement with respect to the heating means to heat the work pieces, means influenced by the temperature of the work pieces, at a region of said path of movement at which the work pieces normally are at an elevated temperature, for controlling said moving means to change the rate of movement of the work pieces in a normally operating range, and means operable when said region is not taken up by a heated portion of a work piece to render said control means inoperable to reduce the rate of movement of the work substantially below the normal regulating range.

6. Apparatus comprising the combination of a number of furnace units each including structure providing a refractory lined chamber having openings in the opposite end walls thereof, said furnace units being in end to end relation for passage therethrough of elongated work pieces to be heated, heating means for firing each chamber to an elevated temperature, means for independently regulating the amount of heat developed in each chamber by its heating means, means for moving the work pieces lengthwise in succession through the chambers, control means past which the work moves responsive to changes in temperature of the heated work for controlling the moving means to change the rate of movement of the work, and means operable when no work is passing said control means, to render said control means momentarily inoperable.

7. Apparatus comprising the combination of a number of furnace units each including structure providing a refractory lined chamber having openings in the opposite end walls thereof, said furnace units being in end to end relation for passage therethrough of elongated work pieces to be heated, heating means for firing each chamber to an elevated temperature, means for independently regulating the amount of heat developed in each chamber by its heating means, means for moving the work pieces lengthwise in succession through the chambers, control means responsive to change in temperature of the heated work for controlling the moving means to change the rate of movement of the work in a normal regulating range, and means operable when workpieces are not in a position for said control means to respond to their temperature to render said control means inoperable to reduce the rate of movement of the work substantially below the normal regulating range.

8. Apparatus for heating elongated metallic bodies comprising means forming a plurality of heating zones, means to control individually the temperature of each heating zone, means responsive to the temperature of each heating zone to adjust the control means for said zone, forwarding means to pass the bodies to be heated through said heating zones, means responsive to the temperature of the bodies at a point along their path of travel, control means operated by said last-mentioned responsive means to adjust the speed at which said forwarding means passes the bodies through said heating zones, and means operable when the means responsive to the temperature of the bodies responds to an abnormally low temperature to interrupt the adjustment of said control means by said responsive means.

9. Apparatus for heating elongated metallic bodies comprising means forming a plurality of heating zones, forwarding means to pass bodies to be heated successively through said heating zones, means responsive to the temperature of said bodies at a point in their path of travel where they are within a predetermined temperature range, means to control the speed at which said forwarding means passes the bodies through said heating zones, means operated by said responsive means to adjust said control means, and means operative when said responsive means responds to a temperature below said temperature range to interrupt the adjustment of said control means.

10. Apparatus for heating elongated metallic bodies including means forming a plurality of heating zones, forwarding means to move said bodies through said heating zones, variable speed drive mechanism for said forwarding means, means responsive to the temperature of said bodies at a point in their path of travel where they are within a predetermined temperature range, control means operated by said responsive means to adjust the speed of said drive mechanism to thereby vary the speed of movement of said bodies so that they will be maintained within said predetermined temperature range, and means operative when said responsive means responds to a temperature below said temperature range to interrupt the adjustment of said drive means by said control means.

11. Apparatus for heating elongated metallic bodies including means forming a plurality of heating zones, forwarding means to move said bodies through said heating zones, variable speed drive mechanism for said forwarding means, means responsive to the temperature of said bodies at a point in their path of travel where they are within a predetermined temperature range, control means operated by said responsive means to adjust the speed of said drive mechanism to thereby vary the speed of movement of said bodies so that they will be maintained within said predetermined temperature range, means responsive to the passage of said bodies past said responsive means, and means operated by said last-mentioned responsive means when no bodies are passing to interrupt the adjustment of said drive means by said control means.

12. The method of heating elongated metal bodies with a plurality of individual furnace units that are aligned in end to end relation and each of which is shorter than the metal bodies, which comprises passing the bodies through the furnace units one after the other to heat the bodies progressively along their length from end to end, controlling the temperature of each furnace unit individually so that it will supply a desired amount of heat, measuring the temperature of the bodies at a predetermined point in their path of travel between adjacent furance units, and varying the speed of travel of the bodies through the furnaces to maintain the temperature at said point at a predetermined value.

13. Apparatus for heating elongated metallic bodies including a plurality of furnace units each comprising structure forming a chamber shorter than the bodies and having openings in opposite ends, means to mount said furnace units in end to end relation, with said openings in line, conveyor means to move said elongated work through said furnace units located between said furnace units and at the entrance end of the first unit and at the exit end of the last unit, means to drive said conveyor means, burners located in the chamber of each furnace unit, means to supply fuel individually to the burners of each furnace unit, means responsive to the temperature of each furnace unit to control the supply of fuel to that unit, means responsive to the temperature of the metallic bodies between two of said furance units, and mechanism operated by said last-mentioned means to adjust the speed of said drive means.

JAMES KNIVETON.

REFERENCES CITED

The following references are of record in the file of this patent:

UNITED STATES PATENTS

| Number | Name | Date |
| --- | --- | --- |
| 1,811,522 | Shover | June 23, 1931 |
| 1,946,971 | Harter | Feb. 13, 1934 |
| 2,089,015 | Bucknam | Aug. 3, 1937 |
| 2,171,362 | Gulliksen | Aug. 29, 1939 |
| 2,177,276 | Bucknam | Oct. 24, 1939 |
| 2,205,182 | Whitten | June 18, 1940 |
| 2,246,907 | Webster | June 24, 1941 |
| 2,337,410 | Peters | Dec. 21, 1943 |